US011897000B2

(12) United States Patent
Geurts et al.

(10) Patent No.: US 11,897,000 B2
(45) Date of Patent: Feb. 13, 2024

(54) DEVICE FOR SORTING POWDER PARTICLES

(71) Applicants: Value Ash Technologies NV, Antwerp (BE); VITO NV, Mol (BE)

(72) Inventors: Roeland Geurts, Mol (BE); Ruben Snellings, Mol (BE); Michel Loots, Antwerp (BE); Vladimir Zyryanov, Antwerp (BE)

(73) Assignees: Value Ash Technologies NV, Antwerp (BE); Vito NV, Mol (BE)

( * ) Notice: Subject to any disclaimer, the term of this patent is extended or adjusted under 35 U.S.C. 154(b) by 0 days.

(21) Appl. No.: 17/766,009

(22) PCT Filed: Oct. 5, 2020

(86) PCT No.: PCT/EP2020/077888
§ 371 (c)(1),
(2) Date: Apr. 1, 2022

(87) PCT Pub. No.: WO2021/064253
PCT Pub. Date: Apr. 8, 2021

(65) Prior Publication Data

US 2022/0347723 A1 Nov. 3, 2022

(30) Foreign Application Priority Data

Oct. 3, 2019 (EP) .................................... 19020552

(51) Int. Cl.
*B07B 7/086* (2006.01)
*B07B 9/02* (2006.01)

(52) U.S. Cl.
CPC ................ *B07B 7/086* (2013.01); *B07B 9/02* (2013.01); *B07B 2220/00* (2013.01)

(58) Field of Classification Search
CPC ............. B07B 7/086; B07B 9/02; B07B 7/08; B07B 7/083; B07B 7/10; B07B 4/00; B07B 4/02
(Continued)

(56) References Cited

FOREIGN PATENT DOCUMENTS

| | | | | |
|---|---|---|---|---|
| CN | 107185837 A | | 9/2017 | |
| EP | 3492184 A1 | * | 6/2019 | ............... B07B 4/02 |

(Continued)

OTHER PUBLICATIONS

International Search Report and Written Opinion dated Feb. 3, 2021 in reference to co-pending European Application No. PCT/EP2020/077888 filed Oct. 5, 2020.

*Primary Examiner* — Gene O Crawford
*Assistant Examiner* — Muhammad Awais
(74) *Attorney, Agent, or Firm* — Dinsmore & Shohl LLP

(57) ABSTRACT

The present invention relates to a device (1) for sorting powder particles into ranges of particles according to one or more of a density, size and/or shape of the particles, wherein the device (1) comprises a particle sorting chamber (2) with at least one sloping side wall (3), which side wall (3) slopes from a lower part (4) of the sorting chamber (2) towards an upper part (5) thereof, wherein the lower part (4) of the sorting chamber (2) is larger dimensioned than the upper part (5), wherein at the upper part (5) of the particle sorting chamber (2) an inlet (6) is provided for supplying a flow of the powder particles to be sorted to the sorting chamber (2), wherein a particle outlet (7) is provided in the upper part (5) of the sorting chamber (2) for conducting sorted particles from the sorting chamber (2) through a duct (8) to at least one particle sedimentation classifier (9), wherein in the lower part (4) of the sorting chamber (2) means (11) are provided for generating an upward rotating gas flow in the sorting chamber (2), the rotating gas flow having a rotation (Continued)

axis which corresponds to an upward axis (10) of the sorting chamber (2).

16 Claims, 5 Drawing Sheets

(58) Field of Classification Search
USPC .......................................................... 209/133
See application file for complete search history.

(56) References Cited

FOREIGN PATENT DOCUMENTS

| | | | | |
|---|---|---|---|---|
| FR | 2544636 | A1 | * | 10/1984 |
| FR | 2544636 | A1 | | 10/1984 |
| WO | 2001041934 | A1 | | 6/2001 |

* cited by examiner

Fig. 2
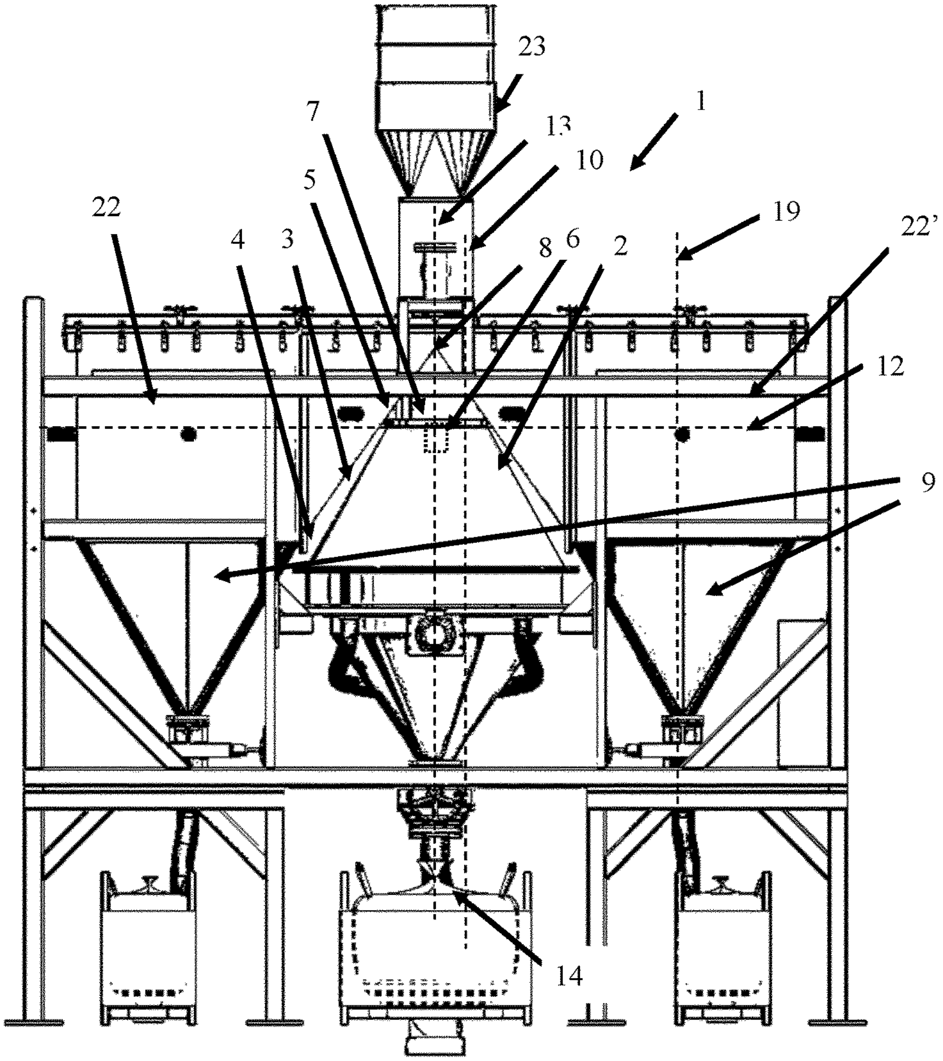
Fig. 3A
Fig. 3B
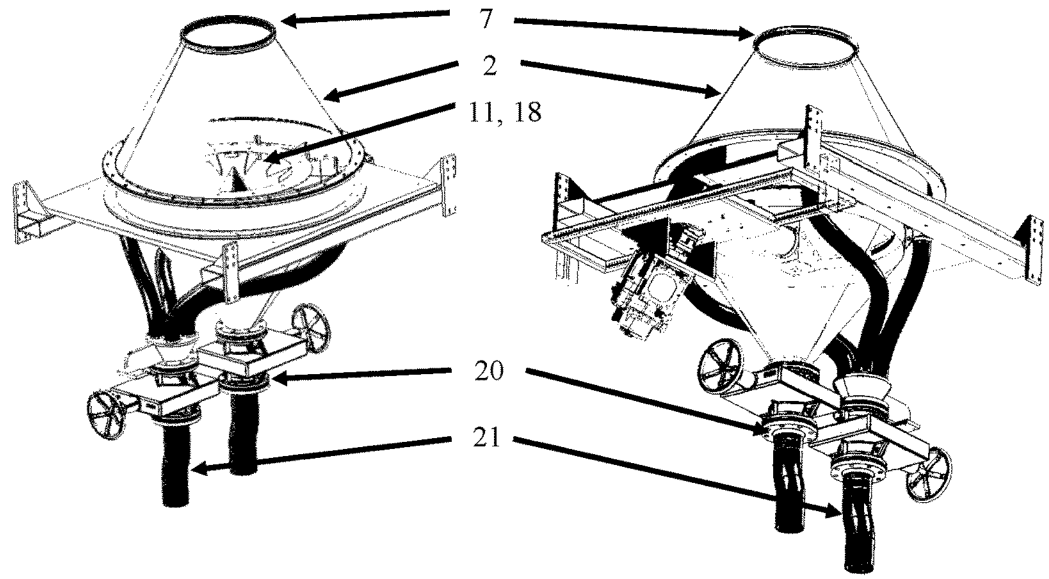

DEVICE FOR SORTING POWDER PARTICLES

CROSS REFERENCES TO RELATED APPLICATIONS

This application is a national-stage application under 35 U.S.C. § 371 of International Application No. PCT/EP2020/077888, filed Oct. 5, 2020, which International Application claims benefit of priority to European Patent Application No. 19020552.6, filed Oct. 3, 2019.

FIELD OF THE INVENTION

The present invention relates to a device for sorting powder particles into ranges of particles according to one or more of a density, size and/or shape of the particles according to the preamble of the first claim.

BACKGROUND OF THE INVENTION

Devices for the dedusting of gas flows are known as such.

WO01/41934 discloses a recirculation system for dedusting and dry-gas cleaning, with the purpose of increasing the collection efficiency of cyclone de-dusters with recirculation. The recirculation systems comprise two cyclones, in particular a reverse-flow type cyclone which serves as particle collector and is positioned upstream of a straight-through cyclone which serves as a particle concentrator. Partial recirculation takes place from the particle concentrator to the particle collector, by the presence of a fan, a venturi or ejector. The gas to be cleaned enters the reverse flow cyclone, which captures some particles. The escaping particles flow with the total gas to the straight-through cyclone concentrator, and part of the gas concentrated in uncaptured particles is recycled to the reverse flow collector cyclone by means of an auxiliary fan, venturi or ejector. WO01/41934 does however not disclose to sort the dust particles according to their size.

RU2616045 discloses a device for separating bulk material particles by particle size within a certain particle size distribution. The device is suitable for application in agriculture, chemical, construction, metallurgical and other industries. The device comprises a centrifugal separator with a rotatable outer drum in the form of an inverted truncated cone, provided with a vibrator. The working surface of the drum consists of interchangeable screens with holes, the diameter of which depends on the material to be separated. A perforated cone sieve is positioned in the inner volume of the drum, a cone grain distributor with an impeller is installed in the lower part of the drum, and a cyclone is connected to the reflector. The drum is positioned in a circumferential casing equipped with receiving trays for collecting the particle fractions. The grain mixture enters the working surface of the inner cone sieve and the grain distributor and is accelerated by the impeller. As a result of rotation and circular vibrations of the drum and sieve, the particle mixture is divided into three fractions: small particles pass through the holes of the drum and enter the corresponding receiving tray, medium sized particles go down the working surface of the drum and enter the corresponding receiving tray, large grains immediately end up in the corresponding tray. Light volatiles are removed as well. Since use is made of dry sieves, separation of particles is limited to diameter sizes of about 90 μm or larger, which limits the applicability of the device.

CN107185837 discloses sorting of particles having a diameter of between 0.01 and 2 mm by adjusting the air speeds of primary air and secondary air within a cyclone separator. The lower middle portion of the barrel of the cyclone separator is connected to a primary air inlet pipe. The bottom of the barrel has a conical structure and is connected with the top of a sedimentation classifier. The lower portion of the sedimentation classifier is provided with a secondary air inlet pipe. The bottom of the sedimentation classifier is connected with a large/heavy particle set collector. Based on the differences of the centrifugal forces and the terminal speeds of large/heavy particles and fine/light particles in mixed particle density particle materials, the particles will settle.

The primary air carries the mixed particle size/density solid particles and enters the cyclone through a primary air intake pipe provided in an upper part of the device below the cyclone separator. The primary air rotates upward to move towards the wall of the cyclone separator with the large particles. Heavy particles and a part of fine/light particles are deposited in the settling classifier below the cyclone under gravity, following collision with the cyclone wall. The large/heavy particles pass through the settling classifier and enter the large/heavy particle group collector, the fine/light particles are returned by the secondary air supplied at a position above the large/heavy particle group collector.

The prior art devices discussed above have limited particle separation abilities, in the sense that they are only suitable for use with particles of a relatively large particle size in the order of tens of μm. Besides this, the degree of separation according to particle size is limited, in particular mixtures of particles are separated into three groups maximum.

There is therefore a need to a device with which mixtures containing particles of smaller particle sizes can be separated from each other at improved separation degrees. There is a need to a device which is capable of providing an improved classification of such smaller particles either according to certain particle size ranges, or according to other parameters or a combination of parameters.

The present invention aims at providing such a device, with which mixtures containing particles of smaller particle sizes can be separated from each other and classified at least according to certain particle size ranges. The present invention aims at providing such a device which is capable of separating and classifying particles according to certain particle size ranges, density or shape, or a combination of two or more of these parameters.

This is achieved according to the present invention with a device which shows the technical features of the characterizing portion of the first claim.

SUMMARY OF THE INVENTION

In a first aspect, the present invention provides a device for sorting powder particles into ranges of particles according to one or more of a density, shape and/or size of the particles. Different types of dry powders could be classified with the device according to the present invention. The need of separating particles according to one or more of their density, shape and/or size, may be attributed to the fact that particles may be suitable for use in specific applications based on their density, shape and/or size. It is therefore important to provide for means allowing for separation or isolation of particles according to specific characteristics and recovering of these particles. For example, some applications require the use of small particles only. E.g. pertaining to the separation of fly ash, a separated fine fraction from said fly ash could be used to replace cement, whereas the fraction containing the larger particles can be used as sand substitute. In other applications, the separation of particles is relevant as the use of the particles in certain chemical processes or applications can change based on the separated fraction. For example, from a metal dust flow supplied to the device of this invention, heavy metals may be concentrated in the fine fractions. Depending on the concentration of heavy metals in said fine fractions, the particles separated can be re-used or, in case they contain hazardous metals it may be preferred to landfill the fine fraction while the large particle fractions can be re-used. The value achieved by the separation of the particles depends on the nature of the material separated, more specifically in some circumstances it might be of importance to separate between e.g. a finer fraction and a larger fraction because either the finer fraction or the larger fraction has a higher value for certain applications.

In case the particle feed supplied to the device according to the present invention contains particles having substantially uniform density, separation of the particles may be improved by the use of an upward directed, rotating gas flow, the flow rate of which may either be higher to permit separation of particles with a higher density or lower in case of particles with a smaller density. In case the mixture to be separated contains particles with different or varying densities e.g. fine mixed waste powders, particles of different densities could also be separated from each other.

The present invention is especially useful for the separation and classification of fine particles, such as ashes originating from combustion processes, such as fly ash. Fly ash is a fine powder, a byproduct of burning pulverized coal, and comprises particles with a particle size usually between 0.5-300 micron. Fly ash usually contains aluminous and siliceous material that forms cement in the presence of water. Separating e.g. fly ash according to one or more of a density, size and/or shape of the particles permits to classify the fly ash particles according to their size and to isolate those which are optimally suited for the manufacturing of concrete having specific properties. More specifically, the separation of superfine fly ash, which usually has a particle size of maximum 10 micron, and its use in the manufacturing of concrete provides for a stronger concrete. This effect may be attributed to the filler effect or packing effect, wherein superfine fly ash is capable of filling small voids in the concrete and therefore increase its strength. More specifically, for example, for making concrete with a sufficient strength, the use of particles of fly ash with a maximum size of 10 micron is required. To our knowledge the device according to the present invention is the only device able to separate powders into fractions of these small sizes. Further, advantageously the device of this invention permits carrying out this particle separation and classification at low cost. By means of the device according to the present invention, a specificity of 90% can be reached, meaning that 90% of particles have a particle size smaller than 10 micron (or related thresholds). Further, by means of the present device a sensitivity of 70%, meaning that 70% of all particles with a size smaller than 10 micron will effectively be separated. Based on the above, the present invention can be advantageously used to separate powders into groups of particles of a certain size.

Further, the finer the particle, the higher the specific surface of the particle compared to its weight. Often, the finer the particle the higher its specific surface activity. This is called Blaine fineness. Therefore, separating particles according to one or more of a density, size and/or shape of the particles can be beneficial whenever the (chemical) reactivity or surface activity of the particles is important.

The device according to the present invention comprises a particle sorting chamber with at least one sloping side wall, which side wall slopes from a lower part of the sorting chamber towards an upper part thereof, wherein the lower part of the sorting chamber is larger cross dimensioned than the upper part. For example, the sorting chamber can take the shape of a cone, wherein the apex of said cone forms said upper part, and the base of said cone forms said lower part and has a larger cross section than the upper part.

At the upper part of the particle sorting chamber of the device of this invention an inlet is provided for supplying a flow of the powder particles to be sorted to the sorting chamber.

At the upper part of the sorting chamber a particle outlet is provided for conducting sorted particles from the sorting chamber to a duct and through that duct towards at least one particle sedimentation classifier.

Further, in the lower part of the sorting chamber means are provided for generating an upward rotating gas flow in the sorting chamber, the rotating gas flow having a rotation axis which corresponds to an upward axis of the sorting chamber.

The particle sorting chamber may have any shape considered by the skilled person, but preferably the particle sorting chamber has a shape with a circular symmetry around a central upward axis of the sorting chamber, so to allow for the upward rotating gas flow in the sorting chamber to rotate with minimal disturbance/turbulence of the gas flow, and ensure optimal particle separation. For example, the shape of the particle sorting chamber can be a cylinder, a cone. In accordance with a further embodiment of the present invention, the particle sorting chamber has the form of a cone.

The nature of the means for generating an upward rotating gas flow in the sorting chamber is not critical to the invention and may comprise any suitable means known to the skilled person, for example a rotor or a fan or a venturi.

In accordance with a further embodiment of the present invention, the outlet extends in a direction crosswise to an upward axis of the sorting chamber, and is located at a position between the particle flow inlet and an upper part of the sloping side wall of the sorting chamber.

In accordance with a further embodiment of the present invention, the upward axis of the at least one particle sedimentation classifier extends parallel to the central upward axis of the sorting chamber.

In accordance with yet a further embodiment of the present invention, the device comprises a series of consecutive sedimentation classifiers positioned at a same or a different distance from each other.

In accordance with a further embodiment of the present invention, two or more series of consecutive sedimentation classifiers are provided on different sides of the central upward axis of the sorting chamber.

In a second aspect, the present invention relates to a method for sorting powder particles into ranges of particles according to one or more of a density, size and/or shape of the particles, wherein a flow of powder particles to be sorted is supplied to an inlet 6 of a device according to the present invention, and the sorted particles are recovered from one or more sorting chambers 2 and/or from one or more sedimentation classifiers 9.

BRIEF DESCRIPTION OF THE FIGURES

With specific reference now to the figures, it is emphasized that the particulars shown are by way of example and for purposes of illustrative discussion of the different embodiments of the present invention only. They are presented in the cause of providing what is believed to be the most useful and readily description of the principles and conceptual aspects of the invention. In this regard no attempt is made to show structural details of the invention in more detail than is necessary for a fundamental understanding of the invention. The description taken with the drawings making apparent to those skilled in the art how the several forms of the invention may be embodied in practice.

FIG. 2, also abbreviated as FIG. 2, illustrates a frontal view of a device for sorting powder particles according to the present invention, wherein only one particle sedimentation classifier is present at each side of the particle sorting chamber.

FIGS. 3A and 3B, also abbreviated as FIGS. 3A and 3B, illustrate a close-up orthographic projection view of a particle sorting chamber in accordance with the present invention. More specifically, FIG. 3A illustrates the top of the left side of the particle sorting chamber, whilst FIG. 3B illustrates the bottom of the left side of the particle sorting chamber.

FIG. 7 is a plot of the results in Table 5.

FIG. 8 is a plot of the results in Table 6.

DETAILED DESCRIPTION OF THE INVENTION

Figure 1:
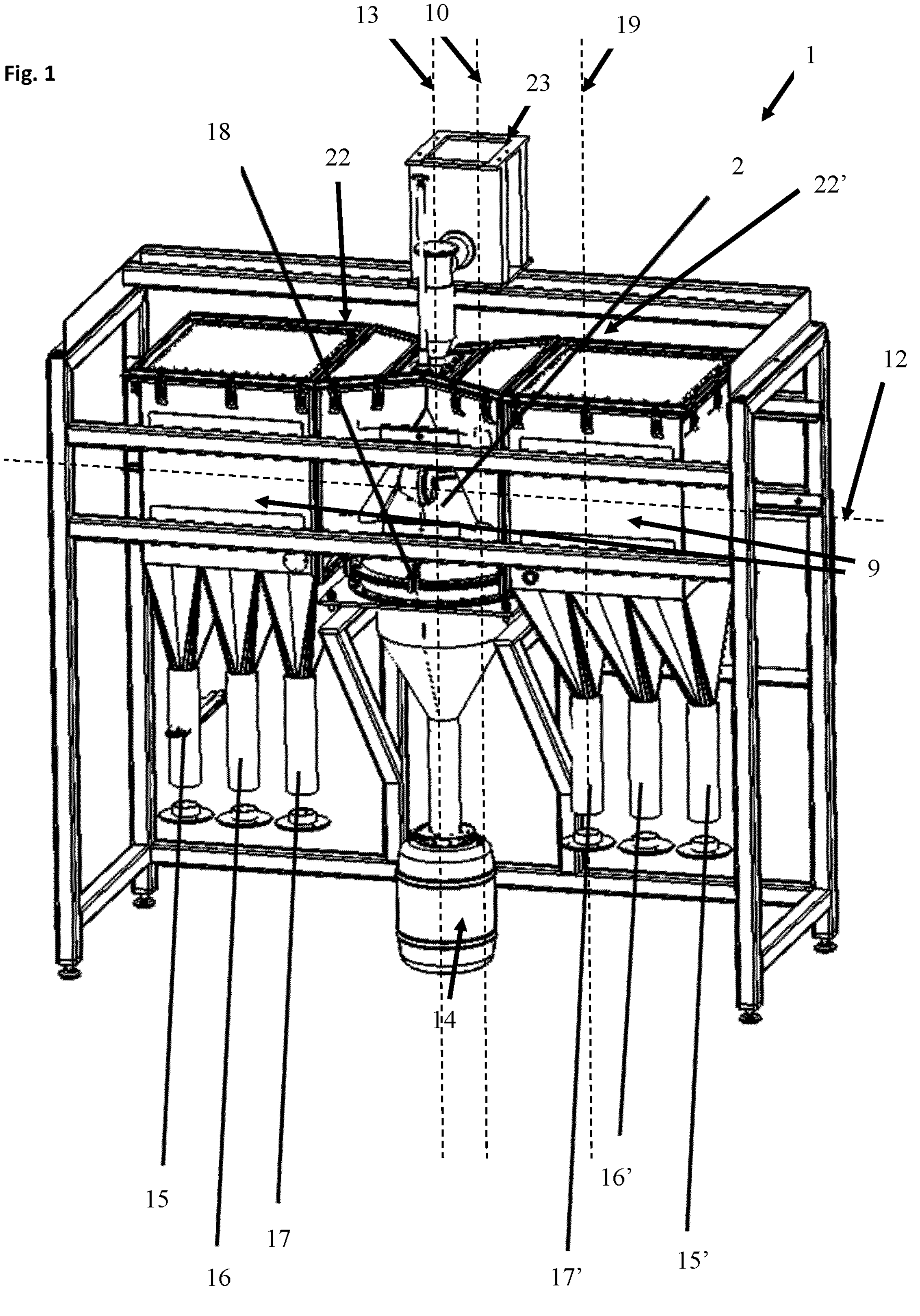
FIG. 1, also abbreviated as FIG. 1, illustrates an orthographic projection view of a device for sorting powder particles in accordance with the present invention, wherein three particle sedimentation classifiers are present at each side of the particle sorting chamber.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. When describing the compounds of the invention, the terms used are to be construed in accordance with the following definitions, unless a context dictates otherwise. The term "about" or "approximately" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" or "approximately" refers is itself also specifically, and preferably, disclosed.

As used in the specification and the appended claims, the singular forms "a", "an", and "the" include plural referents unless the context clearly dictates otherwise. By way of example, "a particle sorting chamber" means one particle sorting chamber or more than one particle sorting chamber.

The present invention relates to a device 1 for sorting powder particles into ranges of particles according to one or more of a density, size and/or shape of the particles. The device of this invention is suitable for use with a wide variety of powder particle materials. The device of this invention is suitable for classifying particles of organic compounds, polymer materials and inorganic materials. The device of this invention is for example suitable for classifying coal particles originating from coal power plants, construction materials such as cement, fly ash, dust flows etc.

In the context of the present invention, by means of the term "powder" or "powder particles", reference is made to solid particles of different density, weight, shape and/or size, in an unclogged state. Powder particles often suffer from clogging into aggregates.

It has been observed that the quality of the separation (the separation degree) is not influenced by the nature of the material from which the particles are made, so that particles made of a high density material e.g. metal dust and particles made of a material with a lower density, such e.g. clay can be separated or classified with the same quality or degree of separation.

The device 1 according to the present invention is also capable of separating powder particles according to their shape, e.g. "needle" shape, "floc" shape etc.

The device 1 according to the present invention is best suited to separate or classify powder particles according to their size, for powders containing particles having a particle size ranging from 0.1-1000 μm, in particular from 1-1000 μm. Powders comprising particles of larger size, above 1000 μm, are preferably removed prior to supplying the powder to the device of this invention, for example by means of a sieving step, so that the powder to be fed to the device of this invention 1 only contains particles with size lower than 1000 μm. It has been observed that the device of this invention is particularly suitable or separating or classifying particles having a size from 0.1 to 200 μm and a density of 1 to 10 $kg/dm^3$. In case the particle density is lower than 0.5 $kg/dm^3$, separation or classification of particles with sizes above 1000 μm can be achieved.

Further, it has been observed that by means of the device 1 according to the present invention, small spherical particles, that are difficult to separate by cyclones, are easily separated with the present invention. Furthermore, it has been found that the device of this invention is capable of causing de-clogging of particle aggregates, and of classifying the individual particles of the aggregate in the unclogged state.

The device 1 of the present invention is therefore capable of dividing powder particles not only according to ranges of sizes, for example into a first group of large particles and a second group of medium sized particles, but it is also capable of dividing small sized particles according to certain particle size ranges and of collecting these in the corresponding sedimentation classifiers 9. In general, the device 1 of this invention is capable of classifying particles preferably with a particle size in the range of between 1 and 1000 μm.

The nature of the material of which the powder particles are composed is not critical to the invention. The device of this invention is suitable for sorting a wide variety of materials such as organic, polymeric and inorganic materials. Examples of polymeric materials include for example particles of polyethylene, polypropylene, polyvinylchloride, polyamid, polyacrylonitrile, herbicides, pesticides, pharmaceutical ingredients etc. Examples of inorganic materials suitable for being classified or sorted in the device of this invention include clay minerals, zeolites, silicates, sand, fly ash, cement, metal dust, etc.

In the context of the present invention, by means of the term "particle sorting chamber" or "sorting chamber", reference is made to a chamber wherein particles are separated according to at least one of size, density, shape or combinations thereof.

Particles parameters such as of size, density, shape contribute in different ways at effecting the separation by means of the sorting chamber. In other words, separation of the particles is affected by any one of particle size, density and shape, but mainly particle size. Particle size, density and shape all have an effect on the separation, and the particle size distribution of the various particles size ranges separated e.g. ultrafine, fine, medium, large . . . . The particle size ranges ultrafine, fine, medium and large correspond to ranges of particle size distribution, therefore a specific cut-off for the particle size provided in this range varies, nevertheless, it can be considered that the ultrafine fraction (D90 equals 4 micron) comprises particles approximately in the range 0.1 to 4 micron, the fine fraction (D90 equals 9 micron), comprises particles approximately in the range 1 to 9 micron, the medium fraction (D90 equals 50 micron) comprises particles approximately in the range 20 to 70 micron whilst the large fraction (D90 equals 70 micron) comprises particles approximately in the range 50 to 200 micron or higher.

In the context of the present invention, by means of the term "sloping side wall", reference is made to side walls of the particle sorting chamber which slant in relation to the upward direction, meaning that the side walls extend under an angle that is not 90 degrees, in other words, that said side walls lay neither on a vertical nor horizontal plane, such as vertical plane comprising an upward axis of the sorting chamber or an horizontal axis crosswise to said upward axis. For example, in accordance with an embodiment of the present invention, the side wall 3 extends under an angle with respect to the upward axis of the sorting chamber which is in the range of 45° to 75°, preferably 55° to 65°, more preferably approximately 60°. It has been found that an angle of approximately 60° is advantageous especially for the classification of fly ash powders, and that changing this angle allows to change the size range of separated particles, and more specifically influences the cut-off range. With cut-off range is meant the size above and/or below which particle classification can be carried out.

The formula expressing the force along the slope direction $F_{||}$ (side wall 3) of the conical sorting chamber is as follows exerted on a spherical particle with density and radius r, can be expressed as a sum of gravity, drag and centrifugal forces:

$$F_{||}=F_g \sin \alpha+F_{d,||}+F_c \cos \alpha$$

wherein gravity $F_g$ is expressed as:

$$F_g=\tfrac{4}{3}\pi r^3 \rho g$$

wherein the centrifugal forces $F_c$ at a certain radius R is defined as:

$$F_c=\frac{4}{3}\pi r^3 \rho \frac{v_{a,t}^2}{R}$$

Where $v_{a,t}^2$ is the azimutal velocity of the air flow. Note however that this velocity strongly depends on R and wherein drag force $F_{d,||}$ is defined (Stokes' Law) as:

$$F_{d,||}=6\pi r \mu (v_{a,||}-v_{||})$$

where μ is the dynamic viscosity of air, $v_{a,||}$ is the air velocity along the cone wall slope and $v_{||}$ is the particle velocity along the cone wall slope. When these forces are balanced, there is the possibility of stable equilibrium/stationary orbits, i.e. particles can, in theory, get stuck at a certain height in the cone. This is due to the specific distribution of the drag and centrifugal forces over the cone wall.

In practice, stationary orbits can occur only for a very narrow range of parameters (e.g. for grain size, a few μm's). Outside this range, the force exerted on a particle is monotonous over the whole surface of the cone slope (either up or down). Also the initial velocity and initial position of a particle is crucial in determining whether a stationary orbit will be realized. The study of the balance between these two competing forces is a simplification which can be useful for rapid assessment of the effect of different flow patterns in the device.

In the context of the present invention, by means of the term "particle sedimentation classifiers" or "particle classifiers", reference is made to a device that receives and stores particles leaving the sorting chamber by difference in sedimentation velocity. More specifically, particle sedimentation classifiers according to the present invention comprise at least one relaxation chamber wherein the particles can settle. The particle sedimentation classifier preferably contains at least one particle sedimentation classifier outlet, to permit collecting the powder particles that have settled in the said particle sedimentation classifier. The particle sedimentation classifier may take any form considered suitable by the skilled person, for example it may take the form of a container, a silo or any other suitable form. The size of the particle sedimentation classifiers may vary within wide ranges, and is preferably selected taking into account the size of the means 11 for generating an upward rotating gas flow crosswise to the upright axis, for example the diameter of the rotor, and the size of chamber 2 crosswise to the upright direction, for example the diameter of chamber 2. It has been observed that the larger the rotor diameter and the cone diameter at its base, the higher is the separation capacity per time unit (for example per hour). Further, it has been observed that the rate of sedimentation in the classifiers depends on the terminal velocity of the particles to be separated, meaning the maximum velocity attainable by an object as it falls through a fluid e.g. air. The volume inside the sedimentation classifiers should be large enough to allow sedimentation of the particles e.g. around 12 times that of the sorting chamber 2.

FIG. 1 illustrates an embodiment of a device 1 in accordance with the present invention. The device 1 shown in FIG. 1 is provided for sorting powder particles into ranges of particles according to one or more of a density, size and/or shape of the particles. The device 1 according to the present invention comprises a particle sorting chamber 2 with at least one sloping side wall 3. The side wall 3 slopes from a lower part 4 of the sorting chamber 2 towards an upper part 5 thereof, and wherein the lower part 4 of the sorting chamber 2 is larger dimensioned than the upper part 5. The device 1 and/or its embodiments are further exemplified by examples and figures contained in the present description of the invention.

More specifically, as illustrated in FIG. 1, powder particles of the materials to be sorted are fed from the top of the device and stored in a supply hopper. A feeder 23, more specifically a screw feeder, is used for dosing the powder particle into the cone sorting chamber 2, after which the particles fall down on the rotor 18 in the bottom of the sorting chamber 2 and are classified from there using an upward directed rotating gas flow. Other types of feeders can be used. The finer-fast moving particles move upward to one or more sedimentation classifiers 9, wherein encounter one or more relaxation chambers 22 that break the gas flow collect the particles, which fall down and exit one or more sedimentation classifier outlets.

More specifically, FIG. 1 illustrates an orthographic projection view of a device for sorting powder particles in accordance with one or more embodiments of the present invention, wherein three particle sedimentation classifiers 9 are present at each side of the particle sorting chamber. The three particle sedimentation classifiers comprise at least one outlet e.g. one of 15, 15', 16, 16', 17, 17' and at least one relaxation chamber e.g. one of 22, 22'. In order to not overcomplicate FIG. 1, only two of the particle sedimentation classifiers 9 are referenced in FIG. 1, nevertheless, it should be understood that in FIG. 1 each one outlet 15, 15', 16, 16', 17, 17' is connected to a respective relaxation chamber like 22 or 22' and constitute a particle sedimentation classifier 9 in itself.

The sorting chamber 2 in FIG. 1 is visible at a central location of the device 1, above a rotor 18, located at the lower part 4 of said sorting chamber. In the present figure, the sorting chamber 2 has a conical shape, in other words, as the shape of a cone, wherein the particles are inserted at the apex of said cone, in the proximity of the upper part 5 of said sorting chamber 2. FIGS. 3A and 3B, 4 and 5 clearly describe the shape and features pertaining to sorting chambers 2 according to the present invention, and will be further discussed in detail. FIG. 1 illustrates three particle sedimentation classifier outlets 15, 16, 17, 15', 16', 17' positioned at varying distance from the sorting chamber 2. After the powder particles separated by means of the sorting chamber 2 are flown out of said sorting chamber 2 from a particle flow outlet 7 position at an upper part 5, the powder particles are conducted through a duct 8, not shown in FIG. 1, wherein powder particles are distributed to said various particle sedimentation classifiers 9 at the left and right of the sorting chamber.

The device for sorting powder particles according to the present invention is a closed system, wherein gas movement is particularly present inside the sorting chamber 2, as a rotating stream of gas, due to the conical shape of said chamber. Due to the fact that the system is a closed system, smaller particles are not prone to settle if still subject to gas flow. Therefore, in order to settle said particles, the gas flow carrying said particles has to be broken to prevent particles to be sucked again inside the sorting chamber 2, after they have exited the particle flow outlet 7, see FIG. 3A or 3B. In the particle sedimentation classifiers 9, the gas flow is broken by relaxation chambers inside comprising hurdles or separators, which hurdles or separators obstruct the particles whilst being pushed by the gas flow further away from the sorting chamber 2. The hurdles or separators are positioned inside the sedimentation classifiers 9 so to form a path from which preferably a majority of the particles are prevented to return back to the sorting chamber 2.

Therefore, on accordance with an embodiment of the present invention the device 1 comprises inside at least one particle separation classifier 9 hurdles or separators provided to prevent at least a part of the particles exiting the sorting chamber 2 to return to the sorting chamber 2.

Nevertheless, it has been seen that depending on the configuration of the device for sorting according to the present invention, and the powder supplied to the device, a percentage of said particles, especially comprising superfine particles, may not be capable of leaving chamber 2 through the outlet and are returned to sorting chamber 2 without therefore being separated, due to the fact that the system in accordance with the present invention is a closed system and superfine particles are more easily carried by gas flow currents. Superfine particles are therefore particles having a particle size too small to be separated by the present device, which is smaller than ultrafine particles, which have a particle size in the range 0.1 to 4 micron.

A steady state of suspended swirling superfine particles may be formed which blocks a part of the exit and reduces somewhat the total capacity. The weight of these superfine particles is too small to permit them to reach the separation classifiers. The percentage of these superfine particles in a powder is usually small and is often negligible, although it may range from 3% to 5% by weight. To compensate for this effect, the separation classifier or classifiers may be provided with one or more obstacles which counteract backflow of the particles to the separation chamber 2. By the presence of the one or more obstacles, relaxation chambers are created inside the sedimentation classifiers 9.

Inside the particle sedimentation classifiers 9, at a location of said relaxation chambers, particles accumulate until they settle by gravity, and may be recovered along the particle sedimentation classifier outlets. It has been observed that vibration from the device 1 itself allow for the cumulated particles to fall down and be collected by containers, without the need for vibrating elements, nevertheless, vibrating membranes or ultrasound could be used if necessary. The sedimentation classifiers, the relaxation chambers and the particle sedimentation classifier outlets can allow the majority of the smallest and/or lightest particles to fall down the sedimentation classifier outlets the furthers away from the sorting chamber 2, whilst the largest and/or heaviest particles fall down the separation classifier outlets the closest to the sorting chamber 2. This is due to the fact that smallest and/or lightest particles can by carried by the gas flow coming from the sorption chamber more easily than heaviest particles, therefore covering a larger distance.

The device 1 of this invention may comprise one single series of consecutive sedimentation classifiers 9 for receiving particles with a small particle size. A series of sedimentation classifiers 9 may comprise two, three, four or more sedimentation classifiers 9 depending on the width of the size distribution of the particle sizes to be classified or sorted. Consecutive sedimentation classifiers 9 may be positioned at a same or a different distance from each other, depending on the intended particle sorting. The number of sedimentation classifiers 9 to be used at each side of the sorting chamber 2 can vary, for example, three sedimentation classifiers can be used at one side of the sorting chamber e.g. left side, whilst only two can be used at e.g. the opposite side e.g. right side, of the sorting chamber 2.

In accordance with yet a further embodiment of the present invention, the device 1 comprises a series of consecutive sedimentation classifiers 9 positioned at a same or a different distance from each other.

In accordance with a further embodiment of the present invention, two or more series of consecutive sedimentation classifiers 9 are provided on different sides of the central upward axis 13 of the sorting chamber 2.

Therefore, the device 1 of this invention may comprise two or more series of consecutive sedimentation classifiers 9 extending from different sides of the central upward axis 13 of the sorting chamber 2. Within different series, consecutive sedimentation classifiers 9 may be positioned at a same or a different distance from each other. Further, in accordance with an embodiment of the present invention, a single sedimentation classifier can be present. Nevertheless, it has been found that the presence of two sedimentation classifiers positioned on opposite sides of sorting chamber 2 is beneficial. The skilled person will be able to select an appropriate volume of the sedimentation classifier, and to select an appropriate number of hurdles positioned in the inner volume of the sedimentation classifier to ensure optimum particle sedimentation and minimize the risk to back-flow of the particles. It has been observed that larger dimensioned sedimentation classifiers provide for the best results. In a device comprising one single sedimentation classifier, the dimensions of the sedimentation classifier are preferably relatively larger in comparison to a device comprising two or more sedimentation classifiers, where the dimensions of the sedimentation classifiers may be relatively smaller. It has been seen that the distance between the at least one particle sedimentation classifier 9 and the sorting chamber 2 should be kept between limits to ensure satisfactory particle separation.

Figure 4:
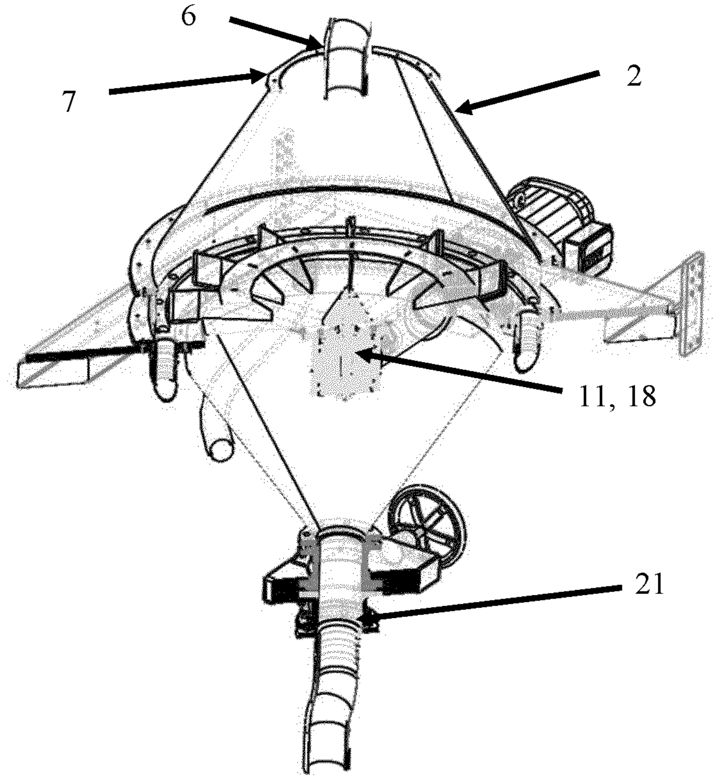
FIG. 4, also abbreviated as FIG. 4, illustrates a vertical cross-section of a particle sorting chamber in accordance with the present invention.

Further, FIG. 1 shows an upward axis 10 positioned centrally respect to the ground, and parallel to the central upward axis 13. The flow outlet 7, not visible in FIG. 1 but visible in FIG. 4, is in accordance with an embodiment of the present invention, located at the upper part 5 of said sorting chamber 2, and extends along a direction crosswise said upward axis 10, meaning along an axis perpendicular to said upward axis 10, meaning a horizontal axis 12. Around an upward axis 10, the rotating gas flow comprising powder particles rotates inside the sorting chamber 2. Therefore, in accordance with a further embodiment of the present invention, the outlet extends in a direction crosswise to an upward axis of the sorting chamber at a position between the particle flow inlet and an upper part of the sloping side wall.

FIG. 2 illustrates a frontal view of a device for sorting powder particles according to one or more embodiments of the present invention, wherein only one particle sedimentation classifier is present at each side of the particle sorting chamber. For sake of clarity, the inlet 6, inside the sorting chamber 2, is also illustrated in this figure. The functioning of the present device is in accordance with the functioning of the device 1 of FIG. 1. In the present figure, the duct 8 is visible at the upper part of the sorting chamber 2. At the bottom of the present figures, particle collectors are present to collect the separated/sorted particles.

Further, in the device 1 in accordance with the present invention said outlet 7 extends in a direction crosswise to an upward axis 10 of the sorting chamber 2 at a position between the particle flow inlet 6 and an upper part 5 of the sloping side wall 3, wherein in the lower part 4 of the sorting chamber 2 means are provided for generating an upward rotating gas flow in the sorting chamber 2, the rotating gas flow having a rotation axis which corresponds to an upward axis 10 of the sorting chamber 2. In FIG. 1 and FIG. 2, due to the fact that the sorting chamber 2 has a conical shape, the upward axis around which the rotating gas flow rotates is the central upward axis 13.

It is clear from the present invention that several upward axis 10 can be present.

In accordance with an embodiment of the present invention, the means 11 for generating an upward rotating gas flow in the sorting chamber 2 may be any means considered suitable by the skilled person, for example a rotor 18 or a fan or a venturi or any other equivalent means or a combination thereof.

More specifically, further, in accordance with an embodiment of the present invention, the particle sorting chamber 2 has a shape provided with a circular symmetry around a central upward axis 13 of the sorting chamber 2. This embodiment of the present invention is visible in FIGS. 3A and 3B. FIGS. 3A and 3B illustrate a close-up orthographic projection view of a particle sorting chamber in accordance with the present invention. More specifically, FIG. 3A illustrates the top of the left side of the particle sorting chamber, whilst FIG. 3B illustrates the bottom of the left side of the particle sorting chamber. FIG. 3 illustrate the presence of a rotor 18 at the lower part of said sorting chamber 2. The walls of the sorting chamber 2 in FIG. 3 are depicted transparent, so to allow the interior of the chamber to be seen. Inside the chamber, a rotor 18 with some blades is present. The rotor allows for at least a part of the gas flow to be suspended inside the sorting chamber 2, wherein separation occurs. Optionally, as depicted in FIG. 3A and FIG. 3B, the large particles duct 21 is adapted to pass the large fraction particles so to collect the latter. The large particle duct 21 is connected to the perimetral part of the circular bottom of the sorting chamber 2.

FIG. 4, also abbreviated as FIG. 4, illustrates a vertical cross-section of a particle sorting chamber in accordance with the present invention. More specifically, the cross-section in FIG. 4 shows the presence of a sorting chamber 2, positioned above a rotor 18. In the figure, a particle flow inlet 6 from which powder particles are fed is visible, along with a particle flow outlet 7 from which the lightest particles exit, and are fed to sedimentation classifiers 9.

Many devices known to the skilled person may be used as a feed for supplying powder particles to the sorting chamber 2, for example a supply pipe, a hopper, a venturi etc. From there the powder particles may fall down in the sorting chamber 2 by gravity, or a forced feed may be provided for example by the use of a transport screw, or feeding screw. In the device 1 according to this invention, the particles enter the sorting chamber 2 through a particle flow inlet 6, visible in FIG. 4, disposed at the upper part of said chamber.

Further, in the device 1 in accordance with the present invention at the upper part 5 of the particle sorting chamber 2 an inlet 6 is provided for supplying a flow of the powder particles to be sorted to the sorting chamber 2, wherein a particle flow outlet 7 is provided in the upper part 5 of the sorting chamber 2 for conducting sorted particles from the sorting chamber 2 through a duct 8 to at least one particle sedimentation classifier 9.

According to an embodiment according of the present invention, the inlet 6 is positioned in a central part of the outlet 7. The positioning of the inlet 6 centrally of outlet 7 beneficial and minimizes the risk to the occurrence of turbulence and/or sedimentation which may counteract the upward particle flow, and counteract the outgoing flow of finest separated particles along the outlet.

Further, in an embodiment according to the present invention, the inlet 6 extends inside the outlet 7. In such way, the inlet 6 provides powder particles to be separated to enter the sorting chamber 2 and be carried by the upward gas flow. In the present embodiment, the inlet 6 extends inside the outlet 7 to achieve that powder particles supplied to the sorting chamber of the device 1 enter the sorting chamber 2.

Adaptors can be used to make the inlet 6 shorter or longer and extend over a shorter or longer distance inside the outlet 7. By means of an interchangeable adaptor the extension of the inlet 6 in the outlet 7 can be readily varied so as to take into account different needs. In a further embodiment according to the present invention the particle inlet 6 is releasably connected with an adaptor adapted to extend into an inner volume of the sorting chamber 2. In other words, the adaptor is adapted to extend from a retracted position inside the sorting chamber 2 to an extended position inside the sorting chamber 2. More specifically, it has been seen that depending on the powder characteristics, the optimal position of the inlet 6 with respect to the outlet 7 may differ, and that depending on the powder characteristics optimal particle classification may be obtained by having the inlet 6 extending in the outlet 8 to a smaller or larger extent. The relative position of the inlet 6 with respect to the outlet 8 influences the classification of the particles, and in the preferred embodiment where the inlet comprises an interchangeable adaptor said classification is readily adjustable.

In accordance with a preferred embodiment of the present invention, both the inlet 6 and the outlet 7 have a circular section, and wherein the diameter of the outlet 7 is larger than the diameter of the inlet 6. Further, in case the inlet 6 is positioned centrally of the outlet 7, the center of the circular cross section of the inlet 6 substantially coincides with the center of the circular cross section of the outlet 7.

In accordance with a preferred embodiment of the present invention, the upward axis 19 of the particle sedimentation classifier extends parallel to the central upward axis 13 of the sorting chamber 2.

The inventors have observed that by the presence of a rotating gas flow which extends around the central upward axis 13 of the particle sorting chamber 2, a simultaneous downward oriented gas flow is created in a central part of the rotating gas flow and an upward oriented gas flow is created in the vicinity of the side wall 3 of the particle sorting chamber 2.

Preferably, the particle sorting chamber 2 has the form of a cone. By means of said conical form, the flow of said gas provides for the best particle separation results. In other words, the particle sorting chamber 2 has preferably a conical shape wherein the apex of the cone is at the upper part of said cone. The conical shape is advantageous because it allows for the gas flow inside the sorting chamber to not be broken, and therefore allow powder particle to have a rotating movement without disturbances that allows for optimal separation of said particles.

The presence of a sorting chamber 2 with a symmetric shape permits collecting particles in a single set of consecutive sedimentation classifiers 9, or in two or more sets of consecutive sedimentation classifiers 9 depending on the intended sorting capacity. By positioning the sedimentation classifiers 9 of each set at a same distance from the central upward axis 13 of the sorting chamber 2, particle sorting may be the same on either side of the central upward axis 13. By positioning the sedimentation classifiers 9 of each set at a different distance from the central upward axis 13 of the sorting chamber 2, different particle size ranges may be collected on either side of the central upward axis 13 and particle sorting may be further fine-tuned.

Figure 5:
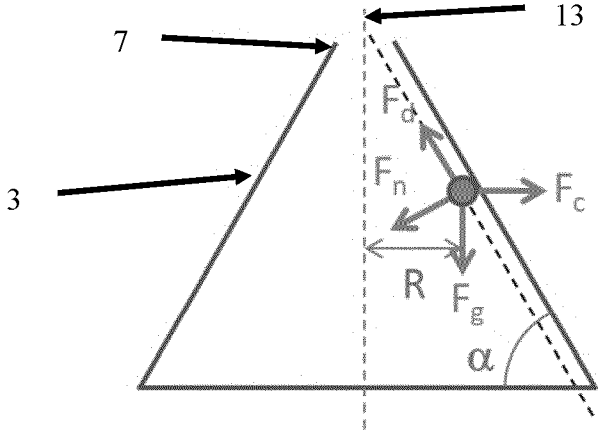
FIG. 5, also abbreviated as FIG. 5, illustrates a schematic representation of some of the forces acting onto a powder particle inside a sorting chamber, wherein the sorting chamber is depicted as a vertical cross-section.

Centrifugal forces $F_c$ occurring in the rotating gas flow cause projection of at least part of the solid particles towards and against the side wall 3 of the particle sorting chamber 2. The normal component of centrifugal forces of the rotating gas flow corresponds to the normal component of the collision force of the particles colliding the side wall 3 of the sorting chamber 2, and is counteracted by a normal force $F_n$ exerted by the side wall 3. The remaining component the of the centrifugal force is a net downward force, which mainly extends along the side wall 3 of the sorting chamber 2. The inventors believe that, depending on the density, shape, weight and/or size of the particles this net downward force may be significantly larger than gravity $F_g$. FIG. 5 illustrates a schematic representation of some of the forces acting onto a powder particle inside a sorting chamber, wherein the sorting chamber is depicted as a vertical cross-section. The inventors further believe that additionally, at the side wall 3, an upward drag force Fa is exerted to the particles by an upward gas flow caused by the rotating gas flow and which extends along the side wall 3. Separation of particles takes place based on the competition of these two forces: the downward component of the centrifugal force $F_c$ which is proportional to the mass of the particle and the upward component of the gas flow, such as e.g. Stokes drag, which is linearly proportional to the particle diameter. As a result of the competition between the downward and upward component, (1) large and medium particle size fractions end up at different positions on the bottom of the sorting chamber 2 and (2) the smaller fast-moving particles will be capable of overcoming gravity forces and move upward, towards the sedimentation classifiers 9. Particles having the smallest size or density will be capable of travelling over a longer distance, to a sedimentation classifier more remote from the sorting chamber 2, whereas particles with a somewhat large size or density will settle in a sedimentation classifier more proximal to the sorting chamber 2.

The nature of the device used for generating the upward rotating gas flow is not critical to the invention, and many devices known to the skilled person may be used, such as for example a fan, a rotor 18, a venture or any other device suitable for providing a rotating gas flows inside the sorting chamber 2. Preferably the device is arranged to provide an upward rotating flow with a flow rate that is adjustable within certain ranges with the purpose of controlling the degree or extent of particle separation, i.e. the ranges of particles that end up in the consecutive sedimentation classifiers 9, taking into account the nature of the powder to be classified. Preferably use is made of a rotor 18, more preferably of a rotor 18 with a variable rotation velocity. The rotation velocity may e.g. depend on the nature and dimensions of the sorting chamber 2. The means for generating the upward rotating gas flow shall me chosen so that the provided gas flow drags and suspends inside the sorting chamber at least a part of the powder particles to be separated.

Further, in accordance with a preferred embodiment of the present invention, the sorting chamber 2 has the shape of a cone, and the device or generating an upward rotating gas flow is a rotor 18 positioned at the base of said cone. The rotor may occupy the majority of the surface available at said base, and the center of said rotor 18 preferably coincides with the center of said cone base.

The separation capacity provided by of the device 1 according to the present invention can be finetuned by optimizing the speed of the rotor, and is also dependent on % of superfine fractions. The feed supply rate is also important to adapt to a specific feed type, optimize efficiency of separation and minimizing energy consumption. Therefore, in order to permit adapting the device to the nature of the powder particles, the feed supply rate is preferably variable. Once a product separation has been optimized, then the optimal feed supply rate is also established and can be fixed.

In a preferred embodiment, the device 1 of this invention provides a closed system, wherein a gas supply is provided between the particle flow inlet 6 and the particle flow outlet 7, from the lower part of the sorting chamber 4, which particle flow outlet 7 is connected to a duct 8 conveying a stream of gas comprising the lightest particles to sedimentation classifiers 9 connected to said duct 8. The duct 8 can allow for said stream of gas carrying particles to be split into two or more, so to feed two or more particle separation classifiers 9. For example, in case the two series of sedimentation classifiers 9 are positioned at an angle of 180 degrees from each other, such as in FIG. 1, the duct 8 is provided to split the gas flow coming from the sorting chamber 2 and conduct gas at said classifiers 9 located at said angle from each other.

The device 1 according to the present invention is a closed system, to minimize the risk that particles of the powder to be separated would escape from the device 1 carried by the gas flow inside the device 1. In the closed system according to the present invention, the gas flown inside the device is not provided with a dedicated gas outlet, out of which powder particles can escape from the sorting chamber 2 without being separated. The separation is based on a closed internal tornado generated inside the sorting chamber 2. The advantages of such a closed system over conventional cyclones are several. A first advantage of the device 1 according to the present invention compared to cyclones is that in cyclones gas speed is about 3 to 4 times faster over the complete path travelled by the particles compared to the maximum speed of particles achieved by the device according to the present invention. With a gas speed of about 3 to 4 times faster, the particles carried by the gas have an energy with a factor 12 to 16. The higher is the particle energy, the easier particle abrasion of e.g. components of the device can occur. A further advantage resides in that the device 1 according to the present invention provides for less occupational risks, less need of intermediate filter to be installed and ultimately is more compact.

As a result, the risk to contamination of the powder particles may be reduced to a minimum, as well as the risk to contamination of the environment by hazardous compounds present in the powder particles. The use of a closed system presents the additional advantage that pressure differences within the device 1 may be reduced to a minimum and that use can be made of small gas flows, thereby limiting gas and energy consumption.

The device 1 of this invention is suitable for use with a wide variety of gases, and the nature of the gas may be adapted taking into account the nature of the powder particles to be classified. A commonly used gas is air, other suitable gases include nitrogen, carbon dioxide, noble gases etc, in particular gases which are inert towards the powder to be classified.

The internal pressure within the system may be balanced as a flow of powder is supplied to the chamber 2. More specifically, in an embodiment according to the present invention the device 1 comprises at least one gas supply adapted to connect the sorting chamber 2 and/or the particle sedimentation classifier 9 with at least one of a powder supply member or feeder 23, wherein the gas supply is provided to equalize the pressure in the sorting chamber 2 and/or the particle sedimentation classifier 9 and powder supply member or feeder 23. This way the pressure in the powder supply member or feeder 23 and the sorting chamber 2 and/or the particle sedimentation classifier 9 can be balanced. The powder supply member or feeder is adapted to provide the powder particles to be separated to the sorting chamber 2, via the particle flow inlet 6.

In accordance with an embodiment of the present invention, one or more devices 1 according to the present invention can be connected in series or in parallel so as to provide improved separation of the powder particles. For example, the powder particles can be fed to various devices in a parallel configuration to provide simultaneous separation without affecting separation quality, or the fractions separated by a device can be fed to another device therefore having a configuration in series and having each device in series being optimized to separate particles according to a specific particle range.

EXAMPLES

The device 1 in accordance with the present invention is capable of separating various types of powder particles. Such as, and not limited to, commercial fly ash, burned oil shale (BOS) ash, fillinox, Portland cement and calcinated clay. All the previously mentioned particle types have been tested during feasibility studies with the device 1 according to the present invention. A description of these types of powder particles can be seen is in Table 1 here below:

TABLE 1 sample description.

| | | |
|---|---|---|
| 1 | Commercial fly ash | Siliceous class F fly ash from fired hard coal |
| 2 | Burned oil shale ash | high calcium content, collected from electrostatic precipitators of circulating fluidized bed (CFB) boilers |
| 3 | Fillinox | a filler from the production of stainless steel |
| 4 | Portland cement | |
| 5 | Calcinated clay | Dredging material Antwerp |

Example 1—Fly Ash

By means of the device according to the present invention, different test runs were conducted, wherein DRAX fly ash was used and separated according to different particle sizes. DRAX fly ash is a commercial siliceous class F fly ash from fired hard coal, collected from the flue gases using electrostatic separators.

The different test runs are characterized by different feeding rates (from 8 to 80 kg/h), and different rotor speeds (from 800 to 1600 rpm). Table 2 illustrates the various test runs conducted with DRAX fly ash.

Separation of the particles fly ash particles was achieved by using a device 1 according to the present invention wherein the particle sedimentation classifiers are as depicted in FIG. 1. More specifically, the device 1 used in the present example is characterized by the presence of three particle sedimentation classifiers present at each side (left, right) of the sorting chamber 2. At the left side, are present, in order, an outermost particle sedimentation classifier—also referred to as 3L comprising sedimentation classifier outlet 15 (outermost), a central particle sedimentation classifier—also referred to as 2L comprising sedimentation classifier outlet 16 (central), and an innermost sedimentation classifier—also referred to as 1L comprising sedimentation classifier outlet 17 (innermost). The same classifiers and classifier outlets are present at the right side, with the outlets referenced 15', 16', 17', and the classifiers referenced in order 3R, 2R, 1R.

By means of the device 1 in accordance with the present invention, medium sized particles are collected in the central collector 14, after being passing through medium particles duct 20, whilst fine particles are collected in classifiers 1L, 1R, whilst ultrafine particles are collected in classifiers 2L, 2R, 3L, 3R. Further, large particles are collected sin a separate container not shown, from the side walls of the sorting chamber 2, passing through large particles duct 21.

For the present example, the device 1 according to the present invention used, particle classifier for ultrafine particles 3L is not used, and therefore particles are collected only by means of 1L, 1R, 2L, 2R, 3R.

TABLE 2

Overview of the different test runs for example 1, wherein the Min Run Time is the minimum running time the rotor is running, providing a stream of air to the sorting chamber 2, the feeding rate is the rate of powder particles fed to the device and the rotor rpm indicate the rpm used by the rotor to create the upward gas flow.

| Exp. # | Material | Rotor rpm | Feeding Rate (kg/h) | Min Run Time (min) | Sample Mass (kg) |
|---|---|---|---|---|---|
| Original motor - minimum capacity: 80 kg/h continuously | | | | | |
| 1 | FA DRAX | 1400 | 40 | 20 | 8 |
| 2 | FA DRAX | 1400 | 40 | 20 | 8 |
| 3 | FA DRAX | 800 | 40 | 20 | 8 |
| 4 | FA DRAX | 1000 | 40 | 20 | 8 |
| 5 | FA DRAX | 1200 | 40 | 20 | 8 |
| 6 | FA DRAX | 1600 | 40 | 20 | 8 |
| 8 | FA DRAX | 1400 | 60 | 13 | 8 |
| 9 | FA DRAX | 1400 | 80 | 10 | 8 |
| 10 | FA DRAX | 1400 | 20 | 39 | 8 |
| 11 | FA DRAX | 800 | 20 | 39 | 8 |
| 12 | FA DRAX | 1600 | 20 | 39 | 8 |
| 13 | FA DRAX | 800 | 80 | 10 | 8 |
| 14 | FA DRAX | 1600 | 80 | 10 | 8 |
| 26 | FA DRAX* | 1400 | 40 | 44 | 120 |
| Motor with reduction - minimum capacity: 4 kg/h continuously | | | | | |
| 37 | FA DRAX | 800 | 24 | 44 | 8 |
| 38 | FA DRAX | 1200 | 24 | 44 | 8 |
| 39 | FA DRAX | 1600 | 24 | 44 | 8 |
| 40 | FA DRAX | 1400 | 24 | 44 | 8 |
| 41 | FA DRAX | 1400 | 8 | 44 | 8 |
| 42 | FA DRAX | 800 | 40 | 44 | 8 |
| 44 | FA DRAX | 1200 | 40 | 44 | 8 |
| 45 | FA DRAX | 1400 | 40 | 44 | 8 |
| 46 | FA DRAX | 1600 | 40 | 44 | 8 |

TABLE 3

Overview of the experimental plan: testing the classification of Drax Fly ash at different rotor speed and feeding rate. Feeding rates with an asterix (*) indicate the experiments are done with a gear reduction on the feeding screw. The experiment between brackets ( ) is the production run.

| Rotor speed | Feeding rate kg/h | | | | | | |
|---|---|---|---|---|---|---|---|
| rpm | 8* | 20 | 24* | 40* | 40 | 60 | 80 |
| 800 | | Exp 11 | Exp 37 | Exp 42 | Exp 3 | | Exp 13 |
| 1000 | | | | | Exp 4 | | |
| 1200 | | | Exp 38 | Exp 44 | Exp 5 | | |

TABLE 3-continued

Overview of the experimental plan: testing the classification of Drax Fly ash at different rotor speed and feeding rate. Feeding rates with an asterix (*) indicate the experiments are done with a gear reduction on the feeding screw. The experiment between brackets ( ) is the production run.

| Rotor speed | Feeding rate kg/h | | | | | | |
|---|---|---|---|---|---|---|---|
| rpm | 8* | 20 | 24* | 40* | 40 | 60 | 80 |
| 1400 | Exp 41 | Exp 10 | Exp 40 | Exp 45 | Exp 1, 2, 7, (26) | Exp 8 | Exp 9 |
| 1600 | | Exp 12 | Exp 39 | Exp 46 | Exp 6 | | Exp 14 |

Results

In the present example, classification of fly ashes with particle sizes between 1 to 300 μm into four fractions was carried out: ultrafine, fine, medium and large. Changing the rotor seed or feeding rate has an influence on the yield of each of the fractions. Further, the optimal feeding rate is linked to the characteristics of the input materials and the rotor speed, wherein the denser or the finer material present in the input material, the lower is the optimal feeding rate. With respect to fly ash, lower feeding rates results in a higher yield for the fine fractions, while a rotor rate of 1400 rpm showed the best results on the yield of the fine fractions.

The PSD of the fine fractions are generally comparable. The PSD of the fine fractions are typically below 30 μm (with a D50 of 5 μm or less). The PSD's of the medium fractions were generally close to the PSD's of the input material. The medium fraction generally made up between 60 and 70% of the input material.

Changing the rotor speed (from 800 to 1600 rpm) or the feeding rate (from 8 to 80 kg/h) had a negligible influence PSD of the different fractions in this example.

Classification Results of the DPS

Figure 6:
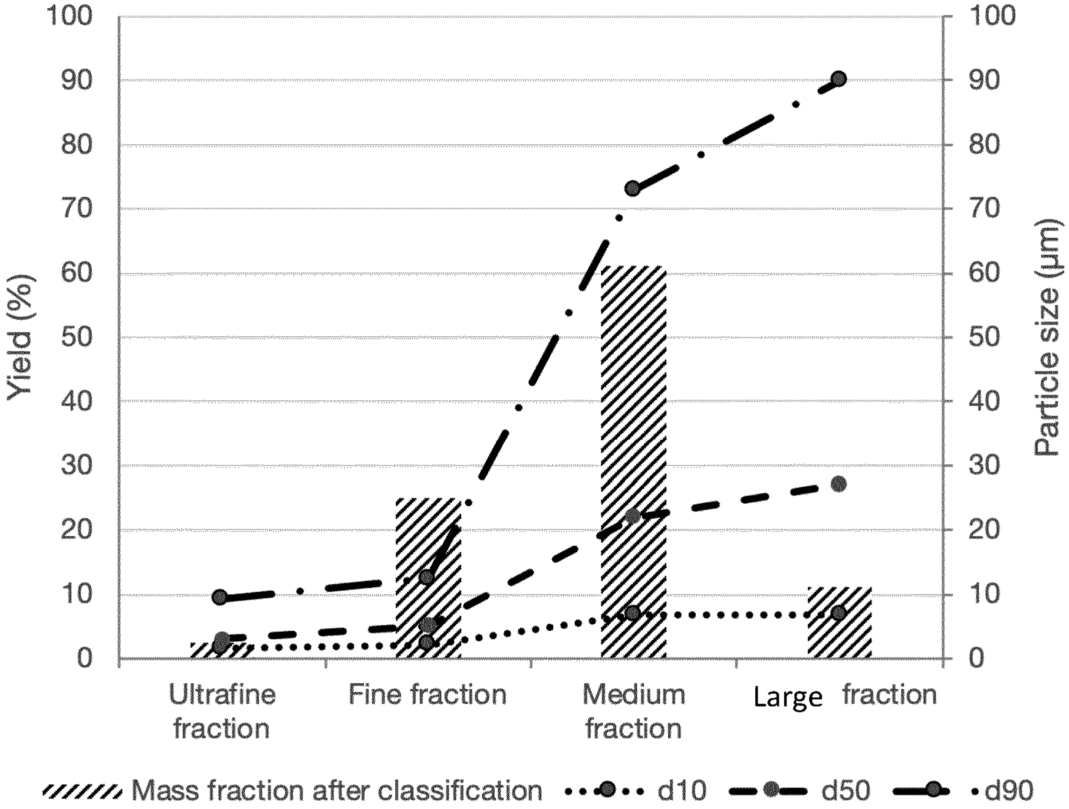
FIG. 6, also abbreviated as FIG. 6, illustrates the results of separation of DRAX fly ashes, by means of the device according to the present invention, more specifically yield and particle size (D10, D50 and D90) of each of the fractions separated at a rotor speed of 1400 rpm and a feeding rate of 40 kg/h.

FIG. 6 gives an overview of the yield of the different fractions and the particle size at a rotor speed of 1400 rpm and a feeding rate of 20 kg/h. Depending on the parameter setting, the particle size and the yield of each of the fractions will change. The paragraphs below describe the effects of changing the parameters on the chemical, mineralogical and physical properties of different fractions.

Mass Balance

The overall recovery (over all 22 experiments) was 100%, but there is a great variation over the different runs: from 90% to 116% (see Table 4). The large spread in the results is related to the relative small input stream (ca 8 kg) versus a large volume machine with a complex geometry. During the experiments, the operators put a ball vibrator on the machine to avoid the accumulation of powders in the machine and optimize the recovery rate. Nevertheless, it was difficult to reach a close mass balance.

As this would also influence the quality measurement (particle size distribution, chemical composition and mineralogical composition) the machine was flushed with new material under the new operating conditions between each experiment, to avoid cross contamination. To compare the yield of the different fractions under the varying operational conditions, the mass streams are normalized with the output stream (see Table 4).

TABLE 4

Mass balance (in %) of the output and different fractions. All the experiments pertain to fly ash DRAX, columns identified with * indicate normalized results. The normalization of the results was achieved by normalizing the recovered % of the mass for a specific fraction to 100% of the output. Due to the adherence onto the wall of the powder particles, the recovered sum of the mass of output could be higher or lower the input mass. E.g. for experiment one more mass was recovered than was provided as input. The results had to be normalized for this reason.

| | Rotor | | Large % | | Medium % | | Fine % (1L + 1R) | | Ultra Fine % (2L + 2R + 3R) | | SUM Fine % | |
|---|---|---|---|---|---|---|---|---|---|---|---|---|
| Exp. # | rpm | Output % | | * | | * | | * | | * | | * |
| 1 | 1400 | 113.9 | 13.0 | 11.4 | 72.8 | 63.9 | 25.5 | 22.4 | 2.6 | 2.3 | 28.1 | 24.6 |
| 2 | 1400 | 90.0 | 12.3 | 13.6 | 48.5 | 53.8 | 22.7 | 25.2 | 6.6 | 7.3 | 29.3 | 32.6 |
| 3 | 800 | 92.2 | 10.2 | 11.0 | 60.8 | 65.9 | 20.8 | 22.5 | 0.5 | 0.5 | 21.3 | 23.1 |
| 4 | 1000 | 94.6 | 13.7 | 14.5 | 51.7 | 54.7 | 28.2 | 29.9 | 0.8 | 0.9 | 29.1 | 30.7 |
| 5 | 1200 | 99.7 | 11.9 | 11.9 | 59.8 | 59.9 | 26.5 | 26.5 | 1.6 | 1.6 | 28.1 | 28.2 |
| 6 | 1600 | 97.0 | 12.2 | 12.6 | 58.3 | 60.0 | 24.1 | 24.8 | 2.5 | 2.6 | 26.5 | 27.4 |
| 8 | 1400 | 105.2 | 12.2 | 11.6 | 58.3 | 55.5 | 32.9 | 31.3 | 1.7 | 1.6 | 34.6 | 32.9 |
| 9 | 1400 | 102.6 | 11.5 | 11.2 | 60.4 | 58.9 | 29.3 | 28.5 | 1.4 | 1.4 | 30.7 | 29.9 |
| 10 | 1400 | 95.2 | 9.8 | 10.3 | 56.6 | 59.4 | 25.9 | 27.3 | 2.8 | 3.0 | 28.8 | 30.2 |
| 11 | 800 | 91.2 | 6.0 | 6.6 | 47.7 | 52.4 | 36.8 | 40.4 | 0.6 | 0.7 | 37.4 | 41.0 |
| 12 | 1600 | 108.2 | 10.9 | 10.1 | 60.7 | 56.1 | 33.8 | 31.2 | 2.8 | 2.6 | 36.6 | 33.8 |
| 13 | 800 | 99.4 | 14.2 | 14.3 | 73.4 | 73.9 | 11.2 | 11.3 | 0.5 | 0.5 | 11.7 | 11.8 |
| 14 | 1600 | 99.7 | 13.7 | 13.7 | 58.8 | 59.0 | 25.9 | 26.0 | 1.3 | 1.3 | 27.2 | 27.3 |
| 37 | 800 | 92.4 | 6.3 | 6.8 | 62.0 | 67.1 | 23.7 | 25.7 | 0.3 | 0.3 | 24.0 | 26.0 |
| 38 | 1200 | 116.1 | 10.2 | 8.8 | 70.0 | 60.3 | 32.9 | 28.4 | 2.9 | 2.5 | 35.8 | 30.9 |
| 39 | 1600 | 104.7 | 11.0 | 10.5 | 62.7 | 59.9 | 28.1 | 26.9 | 2.9 | 2.8 | 31.0 | 29.6 |
| 40 | 1400 | 101.1 | 9.7 | 9.6 | 57.1 | 56.4 | 31.3 | 31.0 | 3.0 | 3.0 | 34.3 | 33.9 |
| 41 | 1400 | 100.6 | 7.6 | 7.5 | 50.5 | 50.2 | 39.8 | 39.6 | 2.7 | 2.7 | 42.5 | 42.3 |
| 42 | 800 | 100.7 | 11.4 | 11.4 | 71.3 | 70.8 | 17.7 | 17.6 | 0.3 | 0.3 | 18.0 | 17.9 |
| 44 | 1400 | 108.4 | 9.7 | 8.9 | 65.8 | 60.7 | 30.0 | 27.7 | 2.9 | 2.7 | 32.9 | 30.4 |
| 45 | 1600 | 94.9 | 10.3 | 10.8 | 62.3 | 65.6 | 20.9 | 22.0 | 1.5 | 1.5 | 22.3 | 23.5 |
| 46 | 1400 | 100.6 | 10.0 | 9.9 | 62.5 | 62.2 | 26.5 | 26.4 | 1.6 | 1.6 | 28.1 | 27.9 |

Particle Size Distribution (PSD)

In the context of the present invention, by means of the term D10, reference is made to the fact that the portion of particles with diameters in μm smaller than this value is 10%. In the context of the present invention, by means of the term D50, reference is made to the fact that the portion of particles with diameters in μm smaller and larger than this value are 50%. In the context of the present invention, by means of the term D90, reference is made to the fact that the portion of particles with diameters in μm smaller than this value are 90%.

Table 5 gives an overview of the particle distribution (PSD) and mass balance (%) of the different fractions separated after a first run (EXP1), wherein fly ash DRAX (labelled ASG/18208 in the following figures) was fed to the device according to the present invention at operating conditions of wherein the rotor rate is 1200 rpm and the feed rate of 40 kg/h.

TABLE 5

PSD and mass balance (%) of the different classified fractions (each result is the average of two measurements). In the present table for experiment 1 in Table 4 above, the fractions separated are classified according to their relative particle size distribution. The present table gives an indication of the quality of the separation.

| | | | | Fine | | Ultrafine | | |
|---|---|---|---|---|---|---|---|---|
| EXP1 | Input | Large | Medium | Fine 1R | Fine 1L | Fine 2R | Fine 2R | Fine 3R |
| D10 (μm) | 2.8 | 6.7 | 7.7 | 2.0 | 2.0 | 1.6 | 1.6 | 1.7 |
| D50 (μm) | 19 | 27 | 23 | 4.3 | 4.5 | 3.1 | 3.1 | 3.3 |
| D90 (μm) | 75 | 108 | 74 | 10 | 14 | 10 | 10 | 9.0 |
| Mass. % | 100 | 13 | 73 | 13 | 12 | 1.0 | 1.0 | 1.2 |

Figure 7:
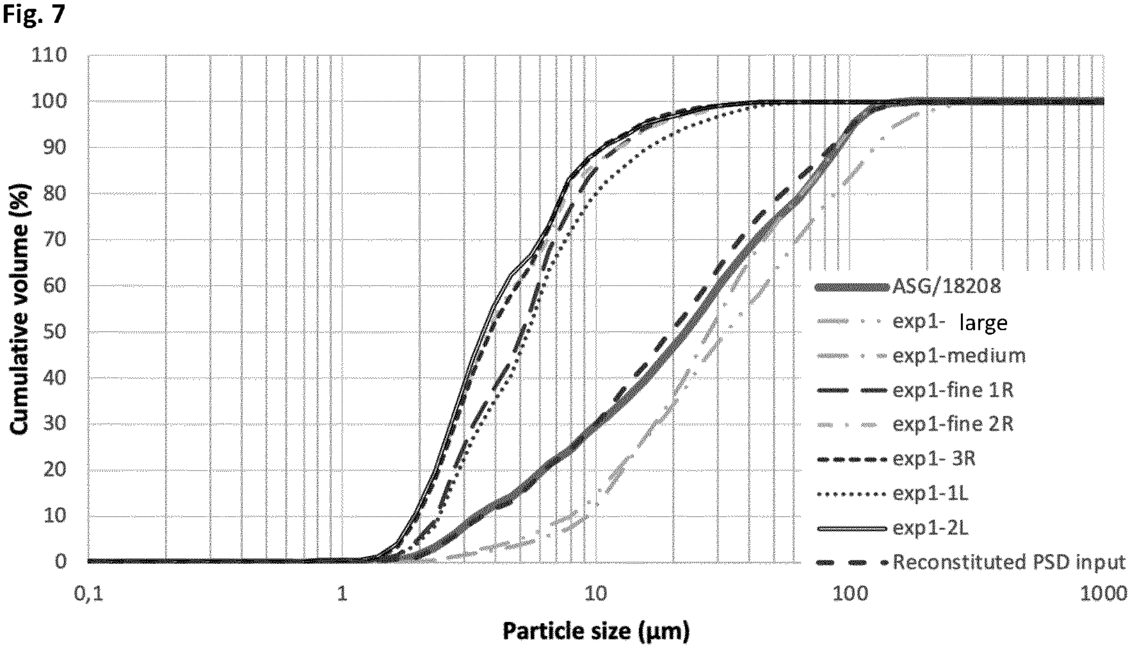
FIG. 7, also abbreviated as FIG. 7, illustrates PSD (Particle Size Distribution) and mass balance (%) of the different classified fractions (each result is the average of two measurements). Operating conditions: rotor rate: 1200 rpm and feed rate of 40 kg/h.

FIG. 7 illustrates the PSD and mass balance (%) of the different classified fractions (each result is the average of two measurements). Operating conditions: rotor rate: 1200 rpm and feed rate of 40 kg/h. In FIG. 7 it can be seen that the reconstituted PSD in experiment 1 is comparable to the PSD of the original input material.

Table 6 gives an overview of the particle distribution (PSD) and mass balance (%) of the different fractions separated after an eight run (EXP8), wherein fly ash DRAX was fed to the device according to the present invention at operating conditions of wherein the rotor rate is 1400 rpm and the feed rate of 60 kg/h.

TABLE 6

PSD and mass balance (%) of the different classified fractions (each result is the average of two measurements). In the present table for experiment 8 in Table 4 above, the fractions separated are classified according to their relative particle size distribution. The present table gives an indication of the quality of the separation.

| | | | | Fine | | Ultrafine | | |
|---|---|---|---|---|---|---|---|---|
| EXP8 | Input | Large | Medium | Fine 1R | Fine 1L | Fine 2R | Fine 2L | Fine 3R |
| D10 (μm) | 2.8 | 6.9 | 5.9 | 2.0 | 2.0 | 1.6 | 1.5 | 1.8 |
| D50 (μm) | 19 | 22 | 20 | 4.4 | 4.7 | 3.1 | 2.9 | 4.1 |
| D90 (μm) | 75 | 79 | 73 | 12 | 15 | 12 | 8.1 | 12 |
| Mass. % | 100 | 12 | 58 | 20 | 13 | 0.58 | 0.56 | 0.56 |

Figure 8:
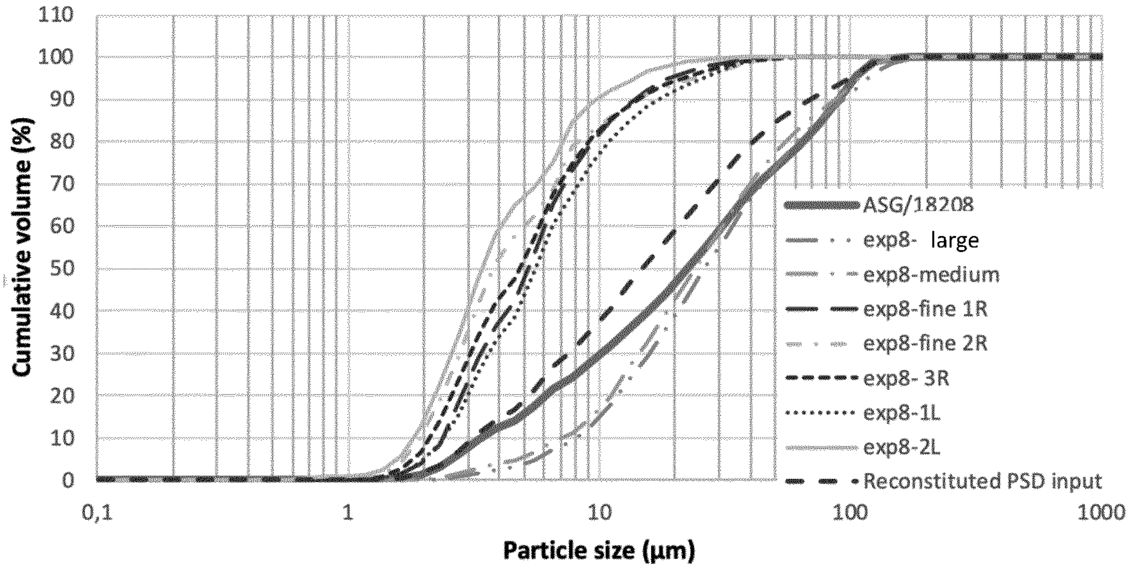
FIG. 8, also abbreviated as FIG. 8, illustrates PSD (Particle Size Distribution) and mass balance (%) of the different classified fractions (each result is the average of two measurements). Operating conditions: rotor rate: 1400 rpm and feed rate of 60 kg/h.

FIG. 8 illustrates PSD and mass balance (%) of the different classified fractions (each result is the average of two measurements). Operating conditions: rotor rate: 1400 rpm and feed rate of 60 kg/h. In FIG. 8, it can be seen that the reconstituted PSD is finer that the input, which indicates the fly ashes are not only classified, but also milled or grinded in the DPS under these circumstances (higher feed rate).

The mineralogy of the different size fractions differs only slightly. Based on a quantitative XRD analysis we can conclude that the finest particle fraction contains the highest amount of amorphous phase(s) and the lowest amount of the crystalline phases of quartz, magnetite and mullite, see Table 7. The input sample was not measured, but the results were composed based on the composition of the different fractions, considering the mass fractions.

Based on the XRD we can see that the fine fractions are enriched in amorphous material (meaning more reactive), while the larger particle fractions contain more crystalline phases such as: mullite ($3Al_2O_3 \cdot 2SiO_2$), quartz ($SiO_2$), magnetite ($Fe_3O_4$) and haematite ($Fe_2O_3$). This may explain a slightly higher $SiO_2$, $Al_2O_3$, $Fe_2O_3$ contents of the larger fractions.

TABLE 1

Quantitative XRD analysis of separated DRAX fly ash ASG/18208

| Phase | Input wt. % | Large wt. % | Medium wt. % | Fine wt. % | Ultrafine wt. % |
|---|---|---|---|---|---|
| Quartz | 8.0 | 9.7 | 9.8 | 3.6 | 3.1 |
| Anhydrite | 0.6 | 0.7 | 0.5 | 0.8 | 0.8 |
| Calcite | 0.7 | 0.9 | 0.7 | 0.7 | 0.8 |
| Hematite | 1.4 | 1.6 | 1.7 | 0.8 | 0.6 |
| Mullite | 6.7 | 7.5 | 7 | 5.7 | 5.4 |
| Magnetite | 2.2 | 2.8 | 2.8 | 0.8 | 0.6 |
| Amorphous | 80.3 | 76.8 | 77.5 | 87.5 | 88.7 |

LEGEND

1 device for sorting powder particles
2 particle sorting chamber
3 sloping side wall
4 lower part of the sorting chamber
5 upper part of the sorting chamber
6 particle flow inlet, or inlet
7 particle flow outlet, or outlet
8 duct
9 particle sedimentation classifiers
10 upward axis of the sorting chamber
11 means for generating an upward rotating gas flow
12 horizontal axis
13 central upward axis
14 central collector
15, 15' outermost sedimentation classifier outlet left, right (3L, 3R)
16, 16' central sedimentation classifier outlet left, right (2L, 2R)
17, 17' innermost sedimentation classifier outlet left, right (1L, 1R)
18 rotor
19 upward axis of the particle sedimentation classifier
20 medium particles duct
21 large particles duct
22, 22' relaxation chambers left, right
23 feeder

The invention claimed is:

1. A device for sorting powder particles into ranges of particles according to one or more of a density, size, and/or shape of the powder particles, the device comprising:

a particle sorting chamber with at least one sloping side wall, the side wall sloping from a lower part of the particle sorting chamber toward an upper part of the particle sorting chamber, wherein:

the lower part of the particle sorting chamber is larger dimensioned than the upper part;

at the upper part of the particle sorting chamber a particle flow inlet is provided for supplying a flow of the powder particles to be sorted to the particle sorting chamber;

a particle flow outlet is provided in the upper part of the particle sorting chamber for conducting sorted particles from the particle sorting chamber through a duct to at least one particle sedimentation classifier;

means for generating an upward rotating gas flow in the particle sorting chamber are provided in the lower part of the particle sorting chamber;

the upward rotating gas flow has a rotation axis corresponding to an upward axis of the particle sorting chamber; and the device provides a closed system, in which a gas supply from the lower part of the particle sorting chamber is provided between the particle flow inlet and the particle flow outlet.

2. The device of claim 1, wherein the particle sorting chamber has a shape with a circular symmetry around a central upward axis of the particle sorting chamber.

3. The device of claim 2, wherein the particle sorting chamber is conical.

4. The device of claim 2, further comprising an upward axis of the at least one particle sedimentation classifier, the upward axis extending parallel to the central upward axis of the particle sorting chamber.

5. The device of claim 1, wherein the means for generating an upward rotating gas flow in the particle sorting chamber comprise a rotor or a fan or a venturi.

6. The device of claim 1, wherein the particle flow outlet extends in a direction crosswise to an upward axis of the particle sorting chamber at a position between the particle flow inlet and an upper part of the sloping side wall.

7. The device of claim 1, wherein the at least one particle sedimentation classifier is a plurality of consecutive particle sedimentation classifiers positioned at varying distances from the particle sorting chamber.

8. The device of claim 7, wherein the device comprises a series of consecutive sedimentation classifiers positioned at a same or a different distance from each other.

9. The device of claim 7, wherein two or more series of consecutive sedimentation classifiers are provided at different sides of the upward axis of the particle sorting chamber.

10. The device of claim 1, wherein at least one particle sedimentation classifier comprises hurdles or separators provided to prevent at least a part of the particles exiting the particle sorting chamber to return to the particle sorting chamber.

11. The device of claim 1, wherein the at least one particle sedimentation classifier is provided to be subjected to vibration.

12. The device of claim 1, wherein the particle flow inlet is positioned in a central part of the particle flow outlet.

13. The device of claim 1, wherein the particle flow inlet is releasably connected with an adaptor adapted to extend into an inner volume of the particle sorting chamber.

14. The device of claim 1, wherein:

the device comprises at least one gas supply adapted to connect the particle sorting chamber and/or the particle sedimentation classifier with at least one of a powder supply; and the gas supply is provided to equalize the pressure in the particle sorting chamber and/or the particle sedimentation classifier and powder supply.

15. A method for sorting powder particles into ranges of particles according to one or more of a density, size, and/or shape of the powder particles, the method comprising:

supplying a flow of powder particles to be sorted to the particle flow inlet of a device according to claim 1; and recovering the sorted particles from one or more particle sorting chambers and/or from one or more sedimentation classifiers.

16. A device for sorting powder particles into ranges of particles according to one or more of a density, size, and/or shape of the powder particles, the device comprising:

a particle sorting chamber with at least one sloping side wall, the side wall sloping from a lower part of the particle sorting chamber toward an upper part of the particle sorting chamber, wherein:

the lower part of the particle sorting chamber is larger dimensioned than the upper part;

at the upper part of the particle sorting chamber a particle flow inlet is provided for supplying a flow of the powder particles to be sorted to the particle sorting chamber;

a particle flow outlet is provided in the upper part of the particle sorting chamber for conducting sorted particles from the particle sorting chamber through a duct to at least one particle sedimentation classifier;

means for generating an upward rotating gas flow in the particle sorting chamber are provided in the lower part of the particle sorting chamber;

the upward rotating gas flow has a rotation axis corresponding to an upward axis of the particle sorting chamber; and a large-particles duct is connected to a perimetral part of a circular bottom of the particle sorting chamber.

* * * * *